US012163007B2

(12) United States Patent
Li et al.

(10) Patent No.: US 12,163,007 B2
(45) Date of Patent: Dec. 10, 2024

(54) NON-PHTHALATE PLASTICIZER BLENDS FOR POLY(VINYL CHLORIDE) RESIN COMPOSITIONS

(71) Applicant: Eastman Chemical Company, Kingsport, TN (US)

(72) Inventors: Zhenpeng Li, Piney Flats, TN (US); Eric Jon Moskala, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 451 days.

(21) Appl. No.: 17/594,972

(22) PCT Filed: Jun. 12, 2020

(86) PCT No.: PCT/US2020/037361
§ 371 (c)(1),
(2) Date: Nov. 4, 2021

(87) PCT Pub. No.: WO2020/263590
PCT Pub. Date: Dec. 30, 2020

(65) Prior Publication Data
US 2022/0325069 A1 Oct. 13, 2022

Related U.S. Application Data

(60) Provisional application No. 62/866,744, filed on Jun. 26, 2019.

(51) Int. Cl.
C08K 5/12 (2006.01)

(52) U.S. Cl.
CPC ..................................... C08K 5/12 (2013.01)

(58) Field of Classification Search
CPC ....................................................... C08K 5/12
See application file for complete search history.

(56) References Cited

U.S. PATENT DOCUMENTS

| | | |
|---|---|---|
| 4,489,188 A | 12/1984 | Jones et al. |
| 4,620,026 A | 10/1986 | Siegel |
| 4,950,702 A | 8/1990 | Arendt |
| 6,969,735 B1 | 11/2005 | Godwin |
| 7,208,545 B1 | 4/2007 | Brunner et al. |
| 7,973,194 B1 | 7/2011 | Kinkade et al. |
| 9,403,965 B2 | 8/2016 | Laufer et al. |
| 2012/0181056 A1 | 7/2012 | Chaudhary et al. |
| 2013/0062094 A1 | 3/2013 | Naert et al. |
| 2015/0112008 A1 | 4/2015 | Patiul et al. |
| 2016/0096350 A1 | 4/2016 | Lu |
| 2016/0159051 A1 | 6/2016 | Lu et al. |
| 2016/0159057 A1 | 6/2016 | Butler |
| 2016/0160005 A1 | 6/2016 | Lu et al. |
| 2016/0160030 A1 | 6/2016 | Chen et al. |
| 2018/0105673 A1 | 4/2018 | Schilling, III et al. |
| 2022/0325068 A1 | 10/2022 | DeLoach et al. |

FOREIGN PATENT DOCUMENTS

| | | |
|---|---|---|
| EP | 3 333 219 A1 | 6/2018 |
| EP | 3 473 669 A1 | 4/2019 |
| EP | 3 476 890 A1 | 5/2019 |
| JP | H0350246 A | 3/1991 |
| JP | H05339413 A | 12/1993 |
| JP | 11 302445 A | 11/1999 |
| RU | 2015/156846 A | 7/2017 |
| RU | 2 633 963 C2 | 10/2017 |
| WO | WO 2007/021987 A1 | 2/2007 |
| WO | WO 2009/085453 A2 | 7/2009 |
| WO | WO 2016094203 A1 | 6/2016 |

OTHER PUBLICATIONS

Notification of Transmittal of the International Search Report and the Written Opinion of the International Searching Authority with Date of Mailing of Oct. 9, 2020 received in International Application No. PCT/US2020/037369.
Notification of Transmittal of the International Search Report and the Written Opinion of the International Searching Authority with Date of Mailing of Oct. 9, 2020 received in International Application No. PCT/US2020/037373.
Notification of Transmittal of the International Search Report and the Written Opinion of the International Searching Authority with Date of Mailing of Oct. 9, 2020 received in International Application No. PCT/US2020/037375.
Notification of Transmittal of the International Search Report and the Written Opinion of the International Searching Authority with Date of Mailing of Oct. 9, 2020 received in International Application No. PCT/US2020/037365.
Tan Jihuai et al: "Highly efficient and recyclable catalysts SnC12-Xh3pw12040/ac With Bronsted and Lewis acid sites for terephthalic acid esterification", Journal of the Taiwan Institute of Chemcical Engineers, Elsevier, Amsterdam, NL; vol. 86, Mar. 31, 2018, pp. 18-24, Mar. 31, 2018.
Malik Sameena N et al: "Treatment of pharmaceutical industrial wastewater by nano-catalyzed ozonation in a semi-batch reactor for improved biodegradability", Science of the Total Environment vol. 678; Apr. 17, 2019; pp. 114-122.
Conn, R. C., et al.; "Some Aromatic Esters of the Monoalkyl Ethers of Ethylene Glycol and Diethylene Glycol"; Journal of the American Chemical Society, 54(11), 1932, pp. 4370-4372.
Ram, A. and Schneider, Z; "Flow Properties of PVC Plastisols"; Industrial & Engineering Chemistry Product Research and Development, 9(3); Sep. 1, 1970; pp. 286-291.
Sears, J. K. and Darby, J. R.; "The Technology of Plasticizers" 1982; pp. 104-107.
Co-pending U.S. Appl. No. 17/595,250, filed Nov. 12, 2021; Pinguan Zheng et al.

(Continued)

*Primary Examiner* — Michael F Pepitone
(74) *Attorney, Agent, or Firm* — Tammye L. Taylor Polk

(57) ABSTRACT

The present application discloses a novel plasticizer formulation comprising bis(2-(2-butoxyethoxy)ethyl) terephthalate, bis(2-ethylhexyl) terephthalate, and optionally tris(2-ethylhexyl) benzene-1,2,4-tricarboxylate. The plasticizer formulation is suitable medium to high temperature applications such as wire and cable insulation and jacketing.

20 Claims, No Drawings

(56) References Cited

OTHER PUBLICATIONS

Co-pending U.S. Appl. No. 17/595,253, filed Nov. 12, 2021; Zhenpeng Li et al.
Co-pending U.S. Appl. No. 17/595,327, filed Nov. 15, 2021; Joseph Alexander DeLoach and Curtis Louis Schilling, III.
Co-pending U.S. Appl. No. 17/594,969, filed Nov. 4, 2021; Joseph Alexander DeLoach et al.
Notification of Transmittal of the International Search Report and the Written Opinion of the International Searching Authority with Date of Mailing of Oct. 9, 2020 received in International Application No. PCT/US2020/037361.
Non-Final Office Communication received in U.S. Appl. No. 17/595,250 dated Jun. 10, 2024.
Non-Final Office Communication received in U.S. Appl. No. 17/595,327 dated Jun. 3, 2024.

NON-PHTHALATE PLASTICIZER BLENDS FOR POLY(VINYL CHLORIDE) RESIN COMPOSITIONS

BACKGROUND OF THE INVENTION

The currently used plasticizers suitable for medium to high temperature applications such as wire and cable insulation and jacketing applications are trimellitates (e.g. TOTM, TINTM) and high molecular weight phthalates (e.g., diisodecy phthalate (DIDP), diundecyl phthalate (DUP)). Those plasticizers show good compatibility and permanence in PVC systems. However, trimellitate type plasticizers are difficult to process due to lack of efficiency, and high molecular weight phthalates have health concerns (e.g. DIDP is listed on CA Prop 65). This application discloses novel non-phthalate plasticizer compositions that are cost effective, and offer good performance and better regulatory compliance.

SUMMARY OF THE INVENTION

The present application discloses a plasticizer composition comprising:
(I) 50 to 70 weight % of bis(2-(2-butoxyethoxy)ethyl) terephthalate I;
(II) 30 to 50 weight % of bis(2-ethylhexyl) terephthalate II; and
(III) 0 to 15 weight % of tris(2-ethylhexyl) benzene-1,2, 4-tricarboxylate III,
wherein the weight % of compounds I, II and III are based on the total weight of the plasticizer composition.

The application also discloses a resin composition comprising:
(a) a resin; and
(b) a plasticizer composition comprising:
(I) 50 to 70 weight % of bis(2-(2-butoxyethoxy)ethyl) terephthalate I;
(II) 30 to 50 weight % of bis(2-ethylhexyl) terephthalate II; and
(III) 0 to 15 weight % of tris(2-ethylhexyl) benzene-1, 2,4-tricarboxylate III,
wherein the weight % of compounds I, II and III are based on the total weight of the plasticizer composition.

The application also discloses insulation and jacketing layers, and cables made with the resin compositions.

DETAILED DESCRIPTION OF THE INVENTION

Definitions

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons" or "($C_{1-5}$) hydrocarbons", is intended to specifically include and disclose $C_1$ and $C_5$ hydrocarbons as well as $C_2$, $C_3$, and $C_4$ hydrocarbons. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

It is to be understood that the mention of one or more process steps does not preclude the presence of additional process steps before or after the combined recited steps or intervening process steps between those steps expressly identified. Moreover, the lettering of process steps or ingredients is a convenient means for identifying discrete activities or ingredients and the recited lettering can be arranged in any sequence, unless otherwise indicated.

As used herein the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

"Alkyl" groups suitable for use herein can be straight, branched, or cyclic, and can be saturated or unsaturated. Alkyl groups suitable for use herein include any ($C_{1-20}$), ($C_{1-12}$), ($C_{1-5}$), or ($C_{1-3}$) alkyl groups. In various embodiments, the alkyl can be a $C_{1-5}$ straight chain alkyl group. In still other embodiments, the alkyl can be a $C_{1-3}$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. Examples such as propyl, butyl, decyl, and the like are not limited to the normal forms, they also include the branched forms. For example, propyl includes n-propyl and isopropyl.

"Stabilizer" means any additive added to a formulation that can prevent that helps to prevent the formulation from degrading. Classes of stabilizers include antioxidants, light stabilizers, acid scavengers, heat stabilizers, flame retardants, and biocides.

Antioxidants are chemicals used to interrupt degradation processes during the processing of materials. Antioxidants are classified into several classes, including primary antioxidant, and secondary antioxidant.

"Primary antioxidants" are antioxidants that act by reacting with peroxide radicals via a hydrogen transfer to quench the radicals. Primary antioxidants generally contain reactive hydroxy or amino groups such as in hindered phenols and secondary aromatic amines. Examples of primary antioxidants include Cyanox™ 1790, 2246, and 425; Topanol® CA (4-[4,4-bis(5-tert-butyl-4-hydroxy-2-methylphenyl)butan-2-yl]-2-tert-butyl-5-methylphenol), Irganox™ 1010, 1076, 1726, 245, 1098, 259, and 1425; Ethanox™ 310, 376, 314, and 330; Evernox™ 10, 76, 1335, 1330, 3114, MD 1024, 1098, 1726, 120. 2246, and 565; Anox™ 20, 29, 330, 70, IC-14, and 1315; Lowinox™ 520, 1790, 221646, 22M46, 44625, AH25, GP45, CA22, CPL, HD98, TBM-6, and WSP;

Naugard™ 431, PS48, SP, and 445; Songnox™ 1010, 1024, 1035, 1076 CP, 1135 LQ, 1290 PW, 1330FF, 1330PW, 2590 PW, and 3114 FF; and ADK Stab AO-20, AO-30, AO-40, AO-50, AO-60, AO-80, and AO-330.

"Phenolic antioxidants" are primary antioxidants having at least one phenolic moiety. Non-limiting examples include Cyanox 1790, Cyanox 2246, Cyanox 425, Ethanox 330, Irganox 1330, Irganox 245, Irganox 259, Irganox 1010, Irganox 1035, Irganox 1076, Irganox 1098, Irganox 1425, Irganox 3114, and Topanol CA.

"Secondary antioxidants" are often called hydroperoxide decomposers. They act by reacting with hydroperoxides to decompose them into nonreactive and thermally stable products that are not radicals. They are often used in conjunction with primary antioxidants. Examples of secondary antioxidants include the organophosphorous (e.g., phosphites, phosphonites) and organosulfur classes of compounds. The phosphorous and sulfur atoms of these compounds react with peroxides to convert the peroxides into alcohols. Examples of secondary antioxidants include Ultranox 626, Ethanox™ 368, 326, and 327; Doverphos™ LPG11, LPG12, DP S-680, 4, 10, S480, and S-9228; Evernox™ 168 and 626; Irgafos™ 126 and 168; Weston™ DPDP, DPP, EHDP, PDDP, TDP, TLP, and TPP; Mark™ CH 302, CH 55, TNPP, CH66, CH 300, CH 301, CH 302, CH 304, and CH 305; ADK Stab 2112, HP-10, PEP-8, PEP-36, 1178, 135A, 1500, 3010, C, and TPP; Weston 439, DHOP, DPDP, DPP, DPTDP, EHDP, PDDP, PNPG, PTP, PTP, TDP, TLP, TPP, 398, 399, 430, 705, 705T, TLTTP, and TNPP; Alkanox 240, 626, 626A, 627AV, 618F, and 619F; and Songnox™ 1680 FF, 1680 PW, and 6280 FF.

"Acid scavengers" are additives that neutralize acids formed during the processing of polymers. Examples of acid scavengers include Hycite 713; Kisuma DHT-4A, DHT-4V, DHT-4A-2, DHT-4C, ZHT-4V, and KW2200; Brueggemann Chemical Zinc Carbonate RAC; Sipax™ AC-207; calcium stearate; Baerlocher GL 34, RSN, GP, and LA Veg; Licomont CAV 102; FACI Calcium Stearate DW, PLC, SP, and WLC; Hangzhou Hitech Fine Chemical: CAST, and ZnST; Songstab™ SC-110, SC-120, SC-130, SM-310, and SZ-210; Sun Ace SAK-CS, SAK-DSC, SAK-DMS, SAK-DZS, and SAK-KS; US Zinc Oxide 201, 205 HAS, 205H, 210, and 210E; Drapex™ 4.4, 6.8, 39, 391, 392, and 392S; Vikoflex™ 4050, 5075, 7170, 7190, 7040, 9010, 9040, and 9080; Joncryl™ ADR 4468, and ADR 4400; Adeka CIZER D-32; Epon™ 1001F, 1002F, and 1007F; Aralidite™ ECN 1299, 1273, 1280, 1299, and 9511; Dynamar RC 5251Q; and Nexamite PBO.

A "salt stabilizer" can be incorporated into the composition to stabilize the composition during processing. The cation component of the salt stabilizer is chosen from aluminum, calcium, magnesium, copper, cerium, antimony, nickel, cobalt, manganese, barium, strontium, zinc, zirconium, tin, cadmium, chromium and iron cations; and the anion component of the salt stabilizer is an $(C_{6-20})$alicyclic carboxylic acid, a $(C_{2-20})$alkyl carboxylic acid, or a $(C_{6-20})$ alkenyl carboxylic acid. Examples of the $(C_{6-20})$alicyclic carboxylic acid, the $(C_{6-20})$alkyl carboxylic acid, or the $(C_{6-20})$alkenyl carboxylic acid include naphthenic acid, abietic acid, cyclohexane carboxylic acid, cyclohexane propionic acid, 3-methyl-cyclopentyl acetic acid, 4-methylcyclohexane carboxylic acid, 2,2,6-trimethylcyclohexane carboxylic acid, 2,3-dimethylcyclopentyl acetic acid, 2-methylcyclopentyl propionic acid, palmitic acid, stearic acid, oleic acid, lauric acid, and the like. Examples of the salt stabilizers include strontium naphthenate, copper naphthenate, calcium naphthenate, zinc naphthenate, magnesium naphthenate, copper abietate, magnesium abietate, titanium acetate, titanium propionate, titanium butyrate, antimony acetate, antimony propionate, antimony butyrate, zinc acetate, zinc propionate, zinc butyrate, tin acetate, tin propionate, tin butyrate, 2-ethylhexylamine, bis(2-ethylhexyl) amine, tetrabutyl phosphonium bromide, dodecyldimenylamine, N,N-dimentylbenzylamine, tetramethyl guanidine, benzyltimethyl ammonium hydroxide, tetrabutyl ammonium hydroxide, 2-ethylimidazole, DBU/2-ethylheaxnoic acid, aluminum acetylacetonate, aluminate lactate, bismuth octoate, calcium octoate, cerium naphthenate, chromium(III) 2-ethylhexanoate, cobalt octoate, copper II acetylacetonate, Iron (Ill) acetylacetonate, manganese naphthenate, nickel acetylacetonate, stannous octoate, zinc acetate, zinc acetylacetonate, zinc octoate, zirconium octoate, and the like.

"Flame retardant" are materials that increase ignition time, reduce flame spreading and rate of burning. The flame retardant should have a high decomposition temperature, low volatility, a minimum effect on thermal and mechanical properties and good resistance to light and ultra-violet radiation. Examples of flame retardants that may be used include halogen containing compounds and phosphorous containing organic compounds such as triaryl, trialkyl or alkyl diaryl phosphate esters. Other materials that may be used include chloroparaffins, aluminum trihydrate, antimony oxides, or zinc broate.

"Fillers" are materials added to formulations or compositions primarily to reduce cost, increase the output of dry blending, increase electrical resistance, increase resistance to ultra-violet light, increase hardness, provide improved heat transmission, and to increase the resistance of heat deformation. Fillers can also impact anti-blocking or anti-slip performance of the compositions. Nonlimiting examples of fillers included calcium carbonate, clays, silica, dolomite, bauxite, titanium dioxide. The particular particle size distribution and average surface area of the filler will be chosen according to the properties it is desired to impart, as would be apparent to one of skill in the art.

"Processing aids" are chemicals that reduce the adhesion of the compositions with machinery surfaces during processing. The lubricants also affect the frictional properties between the polymer resin particles during processing. Non-limiting examples of lubricants include stearic acid, metal stearates, waxes, silicon oil, mineral oil, and synthetic oils.

Plasticizer Composition

The present application discloses a plasticizer composition comprising: (I) 50 to 70 weight % of bis(2-(2-butoxyethoxy)ethyl) terephthalate I; (II) 30 to 50 weight % of bis(2-ethylhexyl) terephthalate II; and (III) 0 to 15 weight % of tris(2-ethylhexyl) benzene-1,2,4-tricarboxylate III, wherein the weight % of compounds I, II and II are based on the total weight of the plasticizer composition.

In one embodiment, compound I is present at 55 to 65 weight %; and compound II is present at 35 to 45 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 50 to 65 weight %; and compound II is present at 35 to 50 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 55 to 60 weight %; and compound II is present at 40 to 45 weight %.

In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 48 to 58 weight %; and compound II is present at 37 to 47 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 58 to 62 weight %; and compound II is present at 38 to 42 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound III is present from 0.5 to 10 weight %. In one embodiment, compound III is present from 0.5 to 6 weight %. In one embodiment, compound III is present at 0 weight %.

In one embodiment, compound I is present at from 48 to 58 weight %, compound II is present from 37 to 47 weight %, and compound III is present from 0.5 to 10 weight %.

Resin Composition

The application also discloses a resin composition comprising: (a) a resin; and (b) a plasticizer composition comprising: (I) 50 to 70 weight % of bis(2-(2-butoxyethoxy)ethyl) terephthalate I; (II) 30 to 50 weight % of bis(2-ethylhexyl) terephthalate II; and (III) 0 to 15 weight % of tris(2-ethylhexyl) benzene-1,2,4-tricarboxylate III, wherein the weight % of compounds I, II and III are based on the total weight of the plasticizer composition.

In one embodiment, compound I is present at 55 to 65 weight %; and compound II is present at 35 to 45 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 50 to 65 weight %; and compound II is present at 35 to 50 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 55 to 60 weight %; and compound II is present at 40 to 45 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 58 to 62 weight %; and compound II is present at 38 to 42 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound I is present at 48 to 58 weight %; and compound II is present at 37 to 47 weight %. In one class of this embodiment, compound III is present from 0.5 to 10 weight %. In one class of this embodiment, compound III is present from 0.5 to 6 weight %. In one class of this embodiment, compound III is present at 0 weight %.

In one embodiment, compound III is present from 0.5 to 10 weight %. In one embodiment, compound III is present from 0.5 to 6 weight %. In one embodiment, compound III is present at 0 weight %.

In one embodiment, compound I is present at from 48 to 58 weight %, compound II is present from 37 to 47 weight %, and compound III is present from 0.5 to 10 weight %.

In one embodiment, the resin comprises a polyvinyl chloride, a polyvinyl acetate, an acrylic polymer, a vinyl chloride-containing copolymer or combinations thereof. In one class of this embodiment, the resin comprises a polyvinyl chloride. In one class of this embodiment, the resin comprises a polyvinyl acetate. In one class of this embodiment, the resin comprises an acrylic polymer. In one class of this embodiment, the resin comprises a vinyl chloride-containing copolymer.

In one embodiment, the resin composition further comprises 10 to 300 parts other components per 100 parts resin, wherein the other components comprises a filler, a pigment, a stabilizer, a foaming agent, a hollow material, an elastomeric material, a rheology control additive, an adhesion promoter, or combinations thereof.

In one class of this embodiment the filler comprises calcium carbonate, fly ash, or combinations thereof, and wherein the stabilizer comprises a metal soap, an epoxidzed oil, an epoxidized fatty acid ester, an organotin compound, or combinations thereof.

In one embodiment, when the any one of the previously disclosed resin compositions is molded into 0.762 mm thick die C cut specimen and exposed to a temperature of 121° C. for 168 hours, in an atmosphere of circulated air as tested according to UL 2556, has a tensile strength retention of at least 80%, as compared to that of an unexposed control of the same composition and shape, wherein the tensile strength is determined according to ASTM D 412 at a 500 mm/min pulling rate. In one class of this embodiment, tensile strength retention is at least 85%. In one class of this embodiment, the tensile strength retention is at least 90%. In one class of this embodiment, the tensile strength retention is at least 95%. In one class of this embodiment, the tensile strength retention is at least 97%.

In one class of this embodiment, the resin composition has a dry time of less than 3 min as measured according to ASTM 2396-94. In one subclass of this class, when the resin composition is molded into 0.762 mm thick die C cut specimen and exposed to a temperature of 136° C. for 168 hours, in an atmosphere of circulated air as tested according to UL 2556, has an elongation at break retention of at least 85%, as compared to that of an unexposed control of the same composition and shape, wherein the elongation of break is determined according to ASTM D 412 at a 500 mm/min pulling rate.

In one subclass of this class, the resin composition has a dry time of less than 2.5 min as measured according to ASTM 2396-94.

In one embodiment, when any one of the previously disclosed resin compositions is molded into 0.762 mm thick die C cut specimen and exposed to a temperature of 136° C. for 168 hours, in an atmosphere of circulated air as tested according to UL 2556, has an elongation at break retention of at least 85%, as compared to that of an unexposed control of the same composition and shape, wherein the elongation of break is determined according to ASTM D 412 at a 500 mm/min pulling rate. In one class of this embodiment, the elongation at break retention is at least 90%. In one class of this embodiment, the elongation at break retention is at least 95%. In one class of this embodiment, the elongation at break retention is at least 97%.

In one embodiment, when any one of the previously disclosed resin compositions is molded into 0.762 mm thick die C cut specimen and exposed to a temperature of 100° C.

for 96 hours in reference 902 oil, in an atmosphere of circulated air as tested according to UL 2556, has an tensile strength retention of at least 90%, as compared to that of an unexposed control of the same composition and shape, wherein the tensile strength is determined according to ASTM D 412 at a 500 mm/min pulling rate. In one class of this embodiment, the tensile strength retention is at least 92%. In one class of this embodiment, the tensile strength retention is at least 94%. In one class of this embodiment, the tensile strength retention is at least 96%. In one class of this embodiment, the tensile strength retention is at least 98%.

In one class of this embodiment, when any one of the previously disclosed resin compositions is molded into 0.762 mm thick die C cut specimen and exposed to a temperature of 100° C. for 96 hours in reference 902 oil, in an atmosphere of circulated air as tested according to UL 2556, has an elongation at break retention of at least 25%, as compared to that of an unexposed control of the same composition and shape, wherein the elongation of break is determined according to ASTM D 412 at a 500 mm/min pulling rate.

In one embodiment, when any one of the previously disclosed resin compositions is molded into 0.762 mm thick die C cut specimen and exposed to a temperature of 100° C. for 96 hours in reference 902 oil, in an atmosphere of circulated air as tested according to UL 2556, has an elongation at break retention of at least 25%, as compared to that of an unexposed control of the same composition and shape, wherein the elongation of break is determined according to ASTM D 412 at a 500 mm/min pulling rate. In one class of this embodiment, the elongation at break retention is at least 30%. In one class of this embodiment, the elongation at break retention is at least 35%. In one class of this embodiment, the elongation at break retention is at least 40%. In one class of this embodiment, the elongation at break retention is at least 50%.

The present application discloses an insulation or jacketing layer comprising any of the previously disclosed resin compositions. In one class of this embodiment, the layer is an insulation layer. In one class of this embodiment, the layer is a jacketing layer.

The present application discloses a cable which comprises a conductor surrounded by at least one layer comprising the resin composition of the previously discloses resin compositions.

The cables can be formed in a variety of configurations including as single-core cables, multi-core cables, tray cables, inter-locked armored cables, and continuously corrugated welded cable constructions. The conductors in such cables can be surrounded by one or more insulation layers and/or jacket layers. In one embodiment, at least one of these insulation layers or jacket layers can be formed with the disclosed composition.

The conductor, or conductive element, of a cable, can generally include any suitable electrically conducting material. For example, a generally electrically conductive metal such as, for example, copper, aluminum, a copper alloy, an aluminum alloy (e.g. aluminum-zirconium alloy), or any other conductive metal can serve as the conductive material. As will be appreciated, the conductor can be solid, or can be twisted and braided from a plurality of smaller conductors. The conductor can be sized for specific purposes. For example, a conductor can range from a 1 kcmil conductor to a 1,500 kcmil conductor in certain embodiments, a 4 kcmil conductor to a 1,000 kcmil conductor in certain embodiments, a 50 kcmil conductor to a 500 kcmil conductor in certain embodiments, or a 100 kcmil conductor to a 500 kcmil conductor in certain embodiments. The voltage class of a cable including such conductors can also be selected. For example, a cable including a 1 kcmil conductor to a 1,500 kcmil conductor and an insulating layer formed from a suitable thermoset composition can have a voltage class ranging from about 1 kV to about 150 kV in certain embodiments, or a voltage class ranging from about 2 kV to about 65 kV in certain embodiments. In certain embodiments, a cable can also meet the medium voltage electrical properties of ICEA test standard S-94-649-2004.

Experimental Section

Abbreviations

° C. is degree Celsius; DB is diethylene glycol monobutyl ether (2-(2-butoxyethoxy)ethanol or diethylene glycol monobutyl ether (2-(2-butoxyethoxy)ethyl-; DBTP is bis(2-(2-butoxyethoxy)ethyl) terephthalate; DIDP is diisodecyl phthalate; DMT is dimethyl terephthalate; DOTP is bis(2-ethylhexyl) terephthalate; g is gram; mmHg is millimeter(s) mercury; h or hr is hour; L is liter; MeOH is methanol; min is minute(s); mL is milliliter; mm is millimeter; MPa is megapascal; PVC is poly(vinyl chloride); TIPT is titanium tetraisopropoxide; TOTM is tris(2-ethylhexyl) benzene-1,2,4-tricarboxylate; TPA is terephthalic acid; wt % is weight percent;

Synthesis of DBTP

DB (2920.1 g, 18 mol) was reacted with TPA (747.5 g, 4.5 mol) in a 3-necked flask with TIPT (3.7 g, 13 mmol) and xylenes (100 g). The flask was equipped with a packed distillation column and a decanter. Xylenes (33 g) was added to the decanter. The reaction mixture was heated to reflux and water began collecting in the decanter when the reaction temperature reaction 209° C. and continued until the reaction temperature reached 231° C. and the reaction was complete when water (181.5 g) was collected after 15 h at reaction temperature.

When reaction was complete, the solution was charged to a 2-L drop bottom flask and heated to 90° C. when aqueous 10% $Na_2CO_3$ (300 g) was charged. After holding at 90° C. for 30 min stirring was stopped and the lower aqueous layer was removed. The organic layer was washed with deionized water (300 g) under the same conditions, then the water layer was removed. Volatiles were then removed from the organic layer by heating to 150° C. in vacuo (<3 mmHg). The material was then further stripped for 2.5 h at 150° C. feeding nitrogen subsurface at a pressure between 50 and 125 mmHg. The material was then cooled to 90° C. and charged with 35 wt % hydrogen peroxide (2 g) and heated back to 120° C. and held for 45 minutes. The material was then cooled to 90° C. and washed 3 times with 15% $Na_2CO_3$ in water (300 g). The material was then dried under vacuum at <3 mmHg at 90° C. and filtered through a glass fiber filter circle coated with diatomaceous earth to give the desired product (m/z 454.256668).

Plasticized PVC Film Sample Preparation

Wire and cable insulation and jacketing formulations were prepared by mixing ingredients in a Flacktek Speedmixer. The formulations were then fused on a two-roll mill at 190° C. and subsequently pressed into 30 mil (~0.762 mm) plaques using a Carver press. The films were examined by eye to ensure no defects or creases that can affect mechanical properties.

Tensile Test

ASTM D 412: Standard Test Methods for Vulcanized Rubber and Thermoplastic Elastomers—Tension Test specimen were cut with standard die C specified in ASTM D 412. Samples were tested at 23° C. with 500 mm/min pulling rate.

Heat Aging

PVC samples were aged in an air circulated oven at specified temperatures and times as specified in UL 2556, clause 4.8.2.2.

Oil Aging

PVC samples were aged in Reference oil 902 at specified temperature and time as specified in UL 2556, clause 4.2.8.3.

Shore a Hardness Test

ASTM 2240-15: Standard Test Method for Rubber Property-Durometer Hardness

Loop Spew Test

ASTM D3291-11: Standard Practice for Compatibility of Plasticizers in PVC Plastics Under Compression DBTP/DOTP Compositions Ex 1-5

The compositions of terephthalate plasticizers are summarized in Table 1. We have discovered that the blend of 60 wt % DBTP and 40 wt % DOTP may be used for 90° C. rating wire insulation material. For PVC insulation material used in 90° C. rated wires, one of the most important requirements specified in UL 83 standard is to preserve a minimum of 75% retention of tensile strength and 45% retention of elongation (in die cut form) from the initial, unaged properties after being aged in forced air circulating oven at 121° C. for 7 days.

TABLE 1

Composition of 2 exemplary mixed ester plasticizers

| Components | Plasticizer Compositions | | | | |
|---|---|---|---|---|---|
| | EX-1 | EX-2 | EX-3 | EX-4 | EX-5 |
| DBTP | 0 wt % | 50 wt % | 60 wt % | 70 wt % | 100 wt % |
| DOTP | 100 wt % | 50 wt % | 40 wt % | 30 wt % | 0 wt % |

A typical wire and cable insulation formulation is as shown in Table 2, with additive levels expressed in parts per hundred parts PVC resin (phr).

TABLE 2

Formulations used in the present study

| Components of Formulations | Formulations | | | | | |
|---|---|---|---|---|---|---|
| | CE 1 | EX-6 | EX-7 | EX-8 | EX9 | EX-10 |
| Suspension PVC - Oxy 240 (from Oxychem) (phr) | 100 | 100 | 100 | 100 | 100 | 100 |
| DIDP (phr) | 45 | | | | | |
| EX-1 (phr) | | 45 | | | | |
| EX-2 (phr) | | | 45 | | | |
| EX-3 (phr) | | | | 45 | | |
| EX-4 (phr) | | | | | 45 | |
| EX-5 (phr) | | | | | | 45 |
| Topanol CA (phr) | 0.14 | 0.14 | 0.14 | 0.14 | 0.14 | 0.14 |
| Calcined clay - Burgess 30P ® from Burgess (phr) | 12 | 12 | 12 | 12 | 12 | 12 |
| Calcium carbonate - Hubercarb ® G35 (from Huber) (phr) | 8 | 8 | 8 | 15 | 15 | 15 |
| Heat stabilizer - Naftosafe ™ PKP 314 (from Chemson) (phr) | 5 | 5 | 5 | 5 | 5 | 5 |
| Antimony trioxide - Naftochem CG 301 (from Chemson) (phr) | 2.5 | 2.5 | 2.5 | 2.5 | 2.5 | 2.5 |

PVC dog-bone samples were aged at 121° C. for 7 days in a forced air oven. The aging results are summarized in Table 3. Heat aging resistance can be significantly improved by increasing the concentration of DBTP in the blend, which can be attributed to the higher molecular weight of DBTP than that of DOTP. More importantly, it was found that concentration of DOTP cannot be higher than 50 wt % in order to pass the UL standard (minimum of 45% retention in elongation). Wire and cable industry usually require a minimum of about 75% retention in elongation to hold a safe margin above the UL requirement. In this case, a blend with ~40 or lower weight percent DOTP is desired to meet the customers requirement, which dramatically out-performs DIDP in heat resistance.

TABLE 3

Physical properties of PVC films before and after aging in a forced air convection oven at 121° C. for 7 days

| Formulation Properties | Formulations | | | | | |
|---|---|---|---|---|---|---|
| | CE-1 | EX-6 | EX-7 | EX-8 | EX-9 | EX-10 |
| Initial tensile strength (MPa) | 23.1 | 21.6 | 21.8 | 22.0 | 22.1 | 21.8 |
| Aged tensile strength (MPa) | 18.5 | 16.8 | 20.8 | 21.3 | 22.0 | 21.6 |
| Tensile strength retention % | 80.1 | 77.8 | 95.4 | 96.8 | 99.5 | 99.1 |
| Initial elongation at break % | 243 | 246 | 252 | 254 | 256 | 268 |
| Aged elongation at break % | 64 | 17 | 116 | 206 | 218 | 257 |
| Elongation retention % | 26.3 | 6.9 | 46.0 | 81.1 | 86.5 | 95.9 |

Wire insulation requires high permanence of plasticizers in PVC. Loop spew test is commonly used to study the exudation tendency of plasticizers within polymeric matrix. As shown in Table 4, EX 1-3 where DBTP concentration is at or lower than 60% shows good compatibility with PVC compound, and no signs of exudation was observed after the 7 days testing period. Unexpectedly, higher DBTP concentration in the blend can lead to exudation which is not acceptable for wire and cable application. The exudation of plasticizers over service time can lead to the loss of mechanical properties and defective wire insulation.

TABLE 4

Loop spew exudation results of PVC films with various plasticizers

| Time | Formulations | | | | | |
|---|---|---|---|---|---|---|
| | CE-1 | EX-6 | EX-7 | EX-8 | EX-9 | EX-10 |
| 4 hours | 0 | 0 | 0 | 0 | 0 | 1 |
| 1 day | 0 | 0 | 0 | 0 | 1 | 2 |
| 7 days | 0 | 0 | 0 | 0 | 1 | 2 |

0 = no exudation,
1 = slight exudation,
2 = moderate exudation,
3 = severe exudation In summary, around 45-70 wt % of DBTP is required in the DOTP/DBTP blends to achieve the optimized heat aging and exudation performances. Higher DBTP concentration can lead to exudation of plasticizer, while lower DBTP content can cause failure in UL heat aging test (Table 5). And a blend containing about 60 wt % DBTP is highly preferred for the more balanced heat aging-permanence performance.

TABLE 5

Summary of properties of various formulations

| | Formulations | | | | | |
|---|---|---|---|---|---|---|
| | CE-1 | EX-6 | EX-7 | EX-8 | EX-9 | EX-10 |
| Plasticizer | DIDP | DOTP | DOTP:DBTP (1:1) | DOTP:DBTP (4:6) | DOTP:DBTP (3:7) | DBTP |
| Heat aging | Fail | Fail | Barely pass | Pass with safe margin | Pass with safe margin | Pass with safe margin |
| Exudation | Pass | Pass | Pass | Pass | Fail | Fail |
| Non-phthalate | No | Yes | Yes | Yes | Yes | Yes |

The blend of DOTP/DBTP (40 wt %/60 wt %) exhibits lower viscosity and dry time in PVC compound (Table 6). Dry time determines the speed that plasticizer been absorbed into PVC resin, and lower dry time can help the wire compounder to significantly increase their though put.

TABLE 6

Viscosity and dry time of plasticizers in PVC dry blends

| | Formulations | |
|---|---|---|
| | CE-1 | EX-8 |
| Plasticizers | DIDP | DOTP:DBTP (40:60) |
| Viscosity (cp) @25° C. | 87.2 | 46.8 |
| Dry time (min) | 3.8 | 2.4 |

The shore A hardness of films with various plasticizers are listed in Table 7. the DOTP/DBTP blend exhibits much better plasticizing efficiency as measured by Shore A hardness than DIDP, which can improve the processability of PVC compound in extrusion process. Furthermore, higher efficiency can allow formulators to reduce plasticizer amount or increase filler loading to achieve the optimal cost-performance profile. Lower plasticizer loading can also help to improve flame retardancy and insulation resistance of the final insulation compounds.

TABLE 7

Shore A hardness of PVC films with various plasticizers

| | Formulations | |
|---|---|---|
| | CE-1 | EX-8 |
| Plasticizer | DIDP | DOTP:DBTP (40:60) |
| Hardness- Shore A | 91.6 | 88.6 |

One can also add additional additives or plasticizers to the DOTP/DBTP blend to achieve enhanced overall performances to meet the requirement of some specialty applications. For instance, some wire products require oil resistance for automotive or appliance applications. It was found that the addition of a small amount of TOTM can effectively improve the oil resistance of the PVC compound and make it particularly useful for oil resistance wires.

TOTM can provide good heat resistance and oil resistance due to its high molecular weight and good compatibility. The optimized plasticizer blend was found to be 53 wt % DBTP, 42 wt % DOTP and 5 wt % TOTM (EX-6 in Table 8) to achieve the best overall performance-cost ratio. A typical wire and cable formulation is shown in Table 9.

TABLE 8

Composition of plasticizer blend containing TOTM

| | Formulation |
|---|---|
| Components | EX-11 |
| DBTP | 53 wt % |
| DOTP | 42 wt % |
| TOTM | 5 wt % |

TABLE 9

Typical formulation with DOTP/DBTP/TOTM blend

| | Formulations | |
|---|---|---|
| Components | EX-12 phr | EX-13 phr |
| Suspension PVC - Oxy 240 (from Oxychem) (phr) | 100 | 100 |
| DIDP (phr) | | |
| EX-3 (phr) | 45 | |
| EX-11 (phr) | | 45 |
| Topanol CA (phr) | 0.14 | 0.14 |
| Calcined clay - Burgess 30P ® from Burgess (phr) | 12 | 12 |

TABLE 9-continued

Typical formulation with DOTP/DBTP/TOTM blend

| | Formulations | |
|---|---|---|
| Components | EX-12 | EX-13 |
| | phr | |
| Calcium carbonate - Hubercarb ® G35 (from Huber) (phr) | 8 | 8 |
| Heat stabilizer - Naftosafe ™ PKP 314 (from Chemson) | 5 | 5 |
| Antimony trioxide - Naftochem CG 301 (from Chemson) | 2.5 | 2.5 |

Physical properties of film samples before and after oil aging test are summarized in Table 10. Films made from the binary blend of DBTP and DOTP exhibits a tensile strength retention of 93.4% and an elongation at break retention of 14.8% after oil aging. However, the tensile strength retention is improved to 97.8% and the elongation at break retention is improved to 30.9% by including 5 wt % of TOTM in the formulation. The addition of TOTM imparts oil resistance to the finished PVC formulation.

TABLE 10

Physical properties of PVC films before and after aging in reference 902 oil at 100° C. for 4 days

| Properties | CE-1 | EX-12 | EX-13 |
|---|---|---|---|
| Plasticizer Ratio | DIDP | DBTP:DOTP (6:4) | DBTP:DOTP:TOTM (53:42:5) |
| Initial tensile strength (MPa) | 21.9 | 22.8 | 22.6 |
| Aged tensile strength (MPa) | 21.2 | 21.3 | 22.1 |
| Tensile strength retention % | 96.8 | 93.4 | 97.8 |
| Initial elongation at break % | 218 | 229 | 230 |
| Aged elongation at break % | 68 | 34 | 71 |
| Elongation retention % | 31.2 | 14.8 | 30.9 |

What is claimed is:

1. A plasticizer composition comprising:
   (I) 50 to 70 weight % of bis(2-(2-butoxyethoxy)ethyl) terephthalate I;
   (II) 30 to 50 weight % of bis(2-ethylhexyl) terephthalate II; and
   (III) 0 to 15 weight % of tris(2-ethylhexyl) benzene-1,2,4-tricarboxylate III,
   wherein the weight % of compounds I, II and III are based on the total weight of the plasticizer composition.

2. The plasticizer composition of claim 1, wherein compound I is present at 55 to 65 weight %; and compound II is present at 35 to 45 weight %.

3. The plasticizer composition of claim 1, wherein compound III is present from 0.5 to 10 weight %.

4. The plasticizer composition of claim 3, wherein compound III is present at 0.5 to 6 weight %.

5. The plasticizer composition of claim 1, wherein compound III is present at 0 weight %.

6. The plasticizer composition of claim 3, wherein compound I is present at from 48 to 58 weight %, compound II is present from 37 to 47 weight %, and compound III is present from 0.5 to 10 weight.

7. A resin composition comprising
   (a) a resin; and
   (b) a plasticizer composition comprising:
   (I) 50 to 70 weight % of bis(2-(2-butoxyethoxy)ethyl) terephthalate I;
   (II) 30 to 50 weight % of bis(2-ethylhexyl) terephthalate II; and
   (III) 0 to 15 weight % of tris(2-ethylhexyl) benzene-1,2,4-tricarboxylate III,
   wherein the weight % of compounds I, II and III are based on the total weight of the plasticizer composition.

8. The resin composition of claim 7, wherein compound I is present at 55 to 65 weight %; and compound II is present at 35 to 45 weight %.

9. The resin composition of claim 7, wherein compound III is present from 0.5 to 10 weight %.

10. The resin composition of claim 9, wherein compound III is present at 0.5 to 6 weight %.

11. The resin composition of claim 7 wherein compound III is present at 0 weight %.

12. The resin composition of claim 9, wherein compound I is present at from 48 to 58 weight %, compound II is present from 37 to 47 weight %, and compound III is present from 0.5 to 10 weight %.

13. The resin composition of claim 7, wherein the resin comprises a polyvinyl chloride, a polyvinyl acetate, an acrylic polymer, a vinyl chloride-containing copolymer or combinations thereof.

14. The resin composition of claim 13, wherein the resin is a polyvinyl chloride.

15. The resin composition of claim 7, further comprising other components, wherein the other components comprises a filler, a pigment, a stabilizer, a foaming agent, a hollow material, an elastomeric material, a rheology control additive, an adhesion promoter, or combinations thereof.

16. The resin composition of claim 7, wherein when the resin composition is molded into 0.762 mm thick die C cut specimen and exposed to a temperature of 121° C. for 168 hours, in an atmosphere of circulated air as tested according to UL 2556, has a tensile strength retention of at least 80%, as compared to that of an unexposed control of the same composition and shape, wherein the tensile strength is determined according to ASTM D 412 at a 500 mm/min pulling rate.

17. The resin composition of claim 7, wherein the resin composition has a dry time of less than 3 min as measured according to ASTM 2396-94.

18. The resin composition of claim 7, wherein when the resin composition is molded into 0.762 mm thick die C cut specimen and exposed to a temperature of 136° C. for 168 hours, in an atmosphere of circulated air as tested according to UL 2556, has an elongation at break retention of at least 85%, as compared to that of an unexposed control of the same composition and shape, wherein the elongation of break is determined according to ASTM D 412 at a 500 mm/min pulling rate.

19. The resin composition of claim 7, wherein when the resin composition is molded into 0.762 mm thick die C cut specimen and exposed to a temperature of 100° C. for 96 hours in reference 902 oil, in an atmosphere of circulated air as tested according to UL 2556, has an tensile strength retention of at least 90%, as compared to that of an unexposed control of the same composition and shape, wherein the tensile strength is determined according to ASTM D 412 at a 500 mm/min pulling rate.

20. The resin composition of claim 7, wherein when the resin composition is molded into 0.762 mm thick die C cut specimen and exposed to a temperature of 100° C. for 96 hours in reference 902 oil, in an atmosphere of circulated air as tested according to UL 2556, has an elongation at break retention of at least 25%, as compared to that of an unexposed control of the same composition and shape, wherein the elongation of break is determined according to ASTM D 412 at a 500 mm/min pulling rate.

* * * * *